US00RE45395E

(19) United States
(12) Reissued Patent
Fulkerson et al.

(10) Patent Number: US RE45,395 E
(45) Date of Reissued Patent: Mar. 3, 2015

(54) NOZZLE

(71) Applicants: Terrence M. Fulkerson, Brunswick Hills, OH (US); Michael R. Sanner, Amherst, OH (US); Brian D. Mather, North Olmsted, OH (US); Joseph G. Shroeder, North Royalton, OH (US); Robert Foster, Jr., Twinsburg, OH (US)

(72) Inventors: Terrence M. Fulkerson, Brunswick Hills, OH (US); Michael R. Sanner, Amherst, OH (US); Brian D. Mather, North Olmsted, OH (US); Joseph G. Shroeder, North Royalton, OH (US); Robert Foster, Jr., Twinsburg, OH (US)

(73) Assignee: Nordson Corporation, Westlake, OH (US)

(21) Appl. No.: 29/479,592

(22) Filed: Jan. 17, 2014

Related U.S. Patent Documents

Reissue of:
(64) Patent No.: Des. 568,439
Issued: May 6, 2008
Appl. No.: 29/286,518
Filed: May 9, 2007

(51) LOC (10) Cl. ..... 23-01
(52) U.S. Cl.
USPC ..... D23/213
(58) Field of Classification Search
USPC ..... D23/213; D8/14.1; D24/112; 118/308; 239/390, 599, 601
See application file for complete search history.

(56) References Cited

U.S. PATENT DOCUMENTS

| | | | | | |
|---|---|---|---|---|---|
| 5,368,237 | A | * | 11/1994 | Fulkerson | 239/706 |
| 6,098,896 | A | * | 8/2000 | Haruch | 239/8 |
| D462,268 | S | * | 9/2002 | Schroeder et al. | D9/435 |
| D469,847 | S | * | 2/2003 | Schroeder et al. | D23/213 |
| D499,463 | S | * | 12/2004 | Mather | D23/213 |
| D532,863 | S | * | 11/2006 | Mather et al. | D23/213 |
| D532,864 | S | * | 11/2006 | Mather et al. | D23/213 |
| 2005/0126476 | A1 | | 6/2005 | Shutic et al. | |

* cited by examiner

*Primary Examiner* — Phillip S Hyder
(74) *Attorney, Agent, or Firm* — Calfee, Halter, Griswold LLP

(57) CLAIM

The ornamental design for a nozzle, as shown and described.

DESCRIPTION

FIG. 1 is a perspective view of a nozzle of the new design;
FIG. 2 is a front elevational view of the nozzle of FIG. 1;
FIG. 3 is a left side elevational view of the nozzle of FIG. 1;
FIG. 4 is a right side elevational view of the nozzle of FIG. 1;
FIG. 5 is a top plan view of the nozzle of FIG. 1; and,
FIG. 6 is a bottom plan view of the nozzle of FIG. 1.
The portions of the Figures shown in broken lines are not part of the claimed design and are for illustration only.

1 Claim, 3 Drawing Sheets

Figure 1:
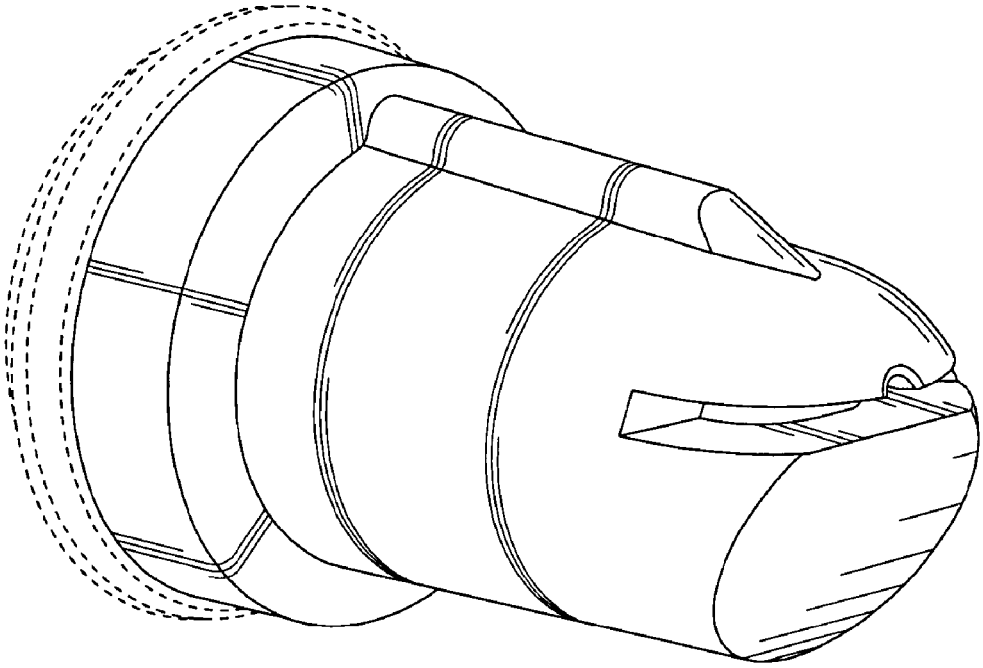
Figure 2:
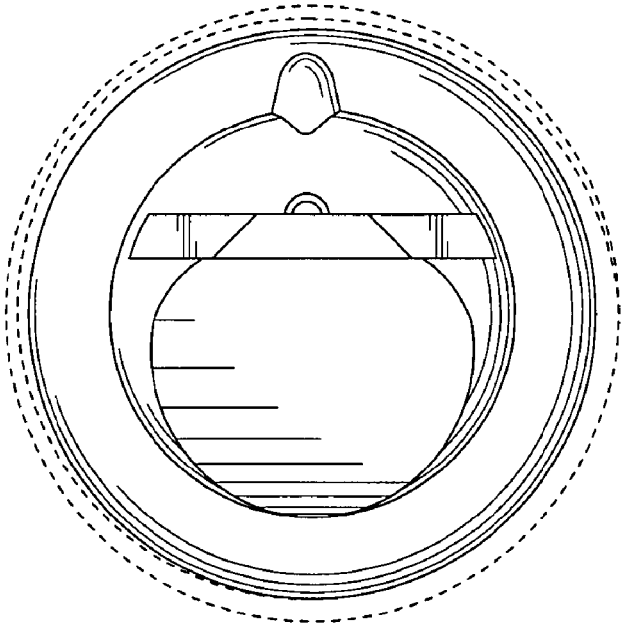
Figure 3:
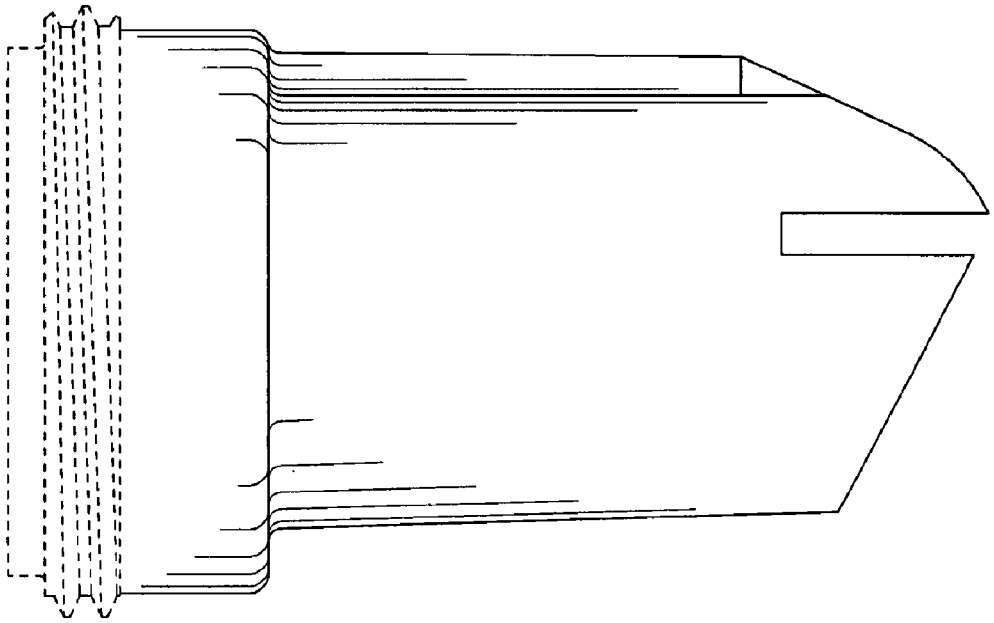
Figure 4:
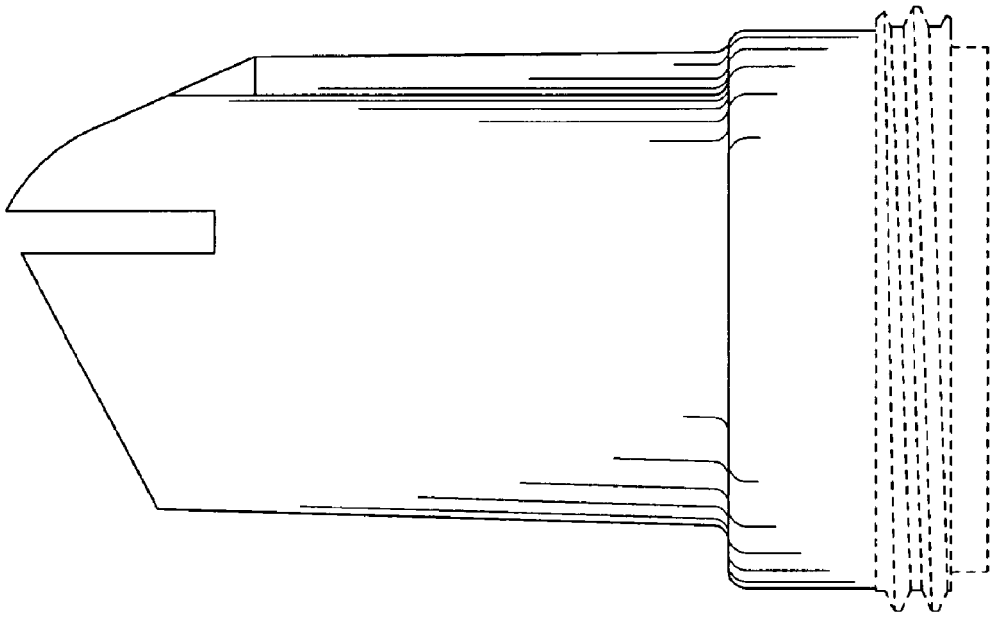
Figure 5:
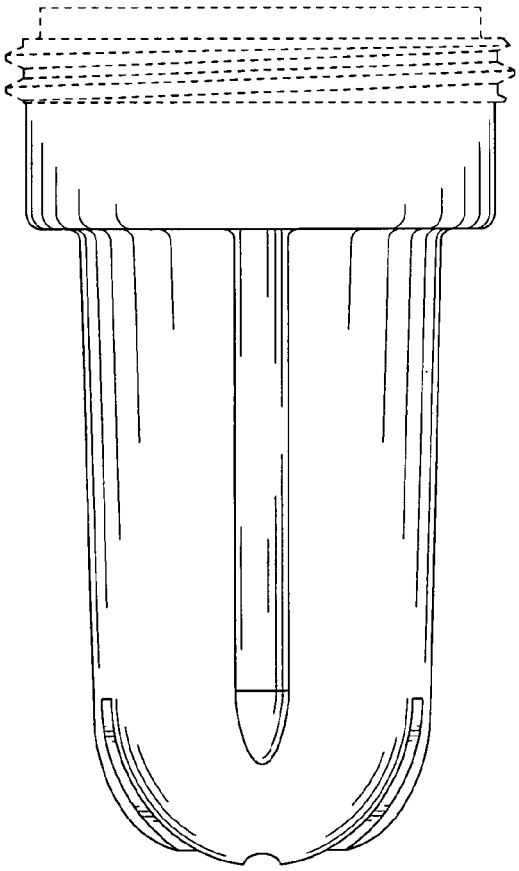
Figure 6:
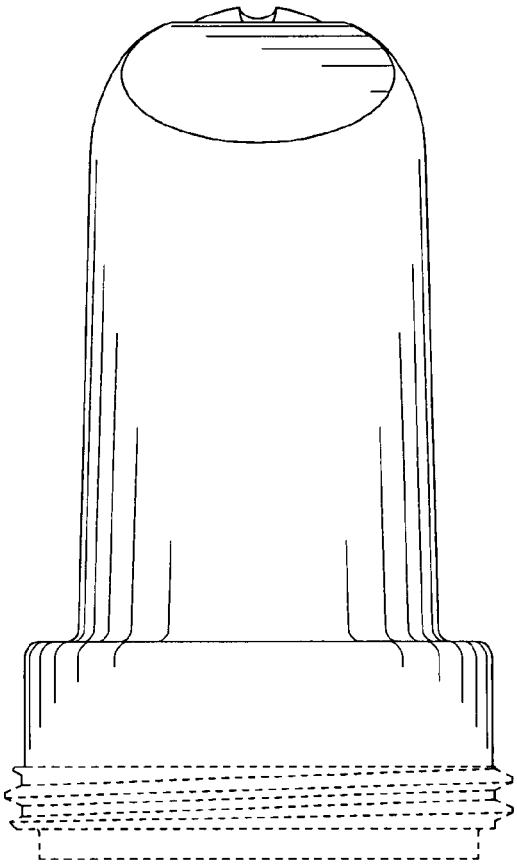

Matter enclosed in heavy brackets [ ] appears in the original patent but forms no part of this reissue; matter printed in italics indicates the additions made by reissue.